(No Model.) 2 Sheets—Sheet 1.
F. F. STÖGERMAYR.
INDUCTION COIL.
No. 351,077. Patented Oct. 19, 1886.
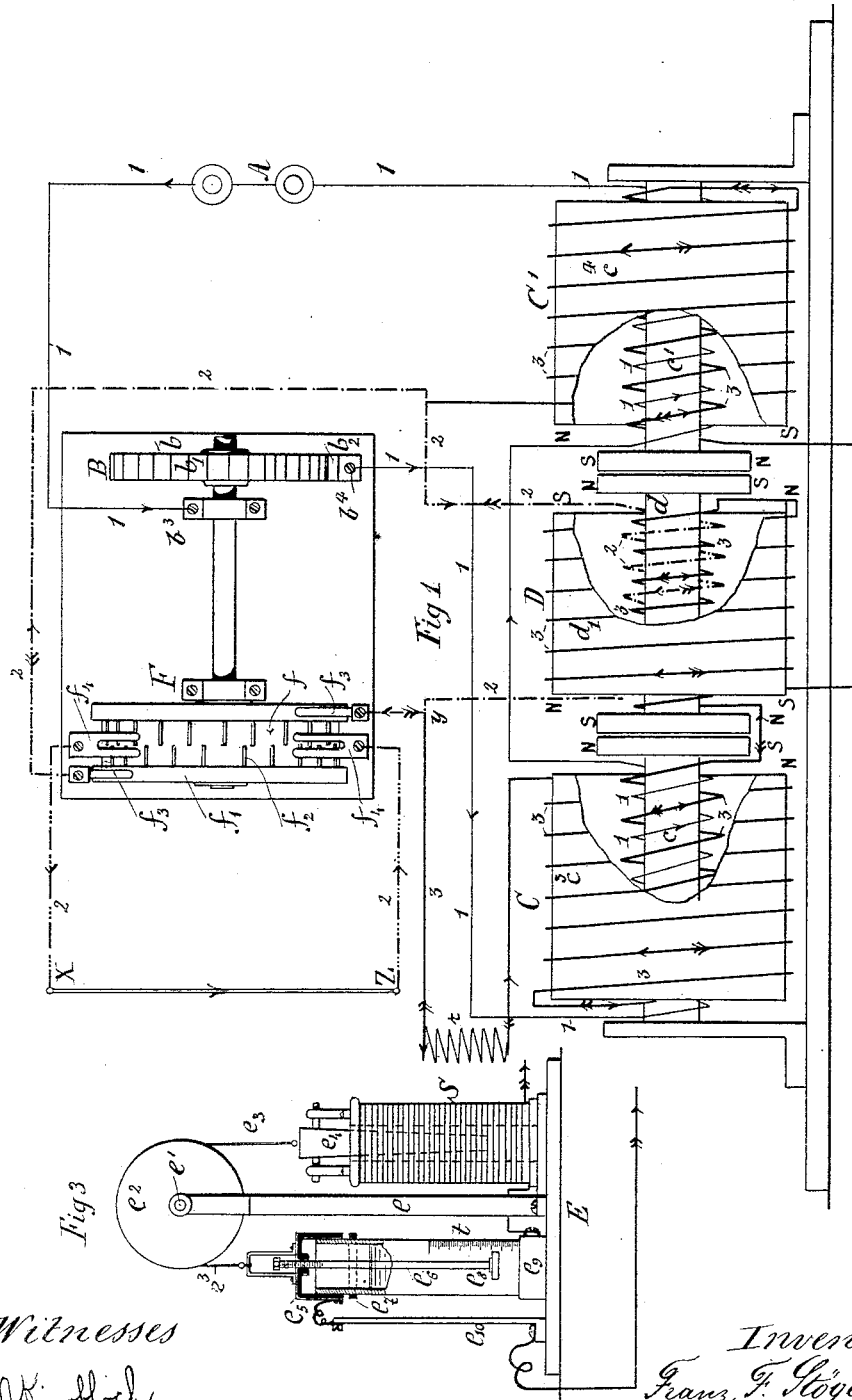
Witnesses
O. M. Knobloch.
C. M. Gallaher.
Inventor
Franz F. Stögermayr
fr Henry Orth
his atty.

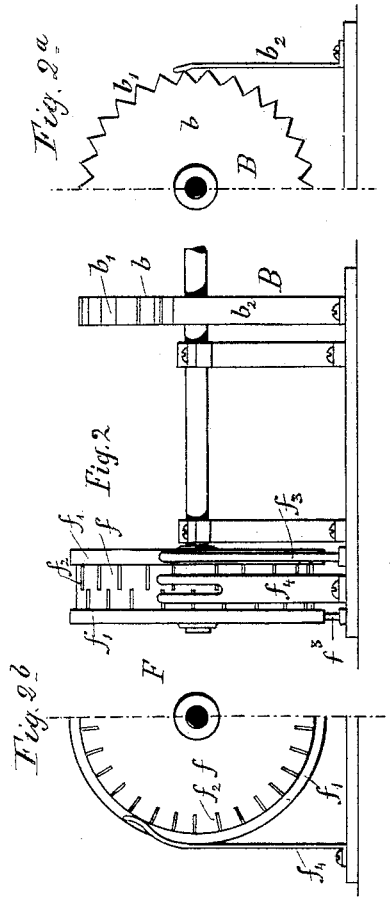
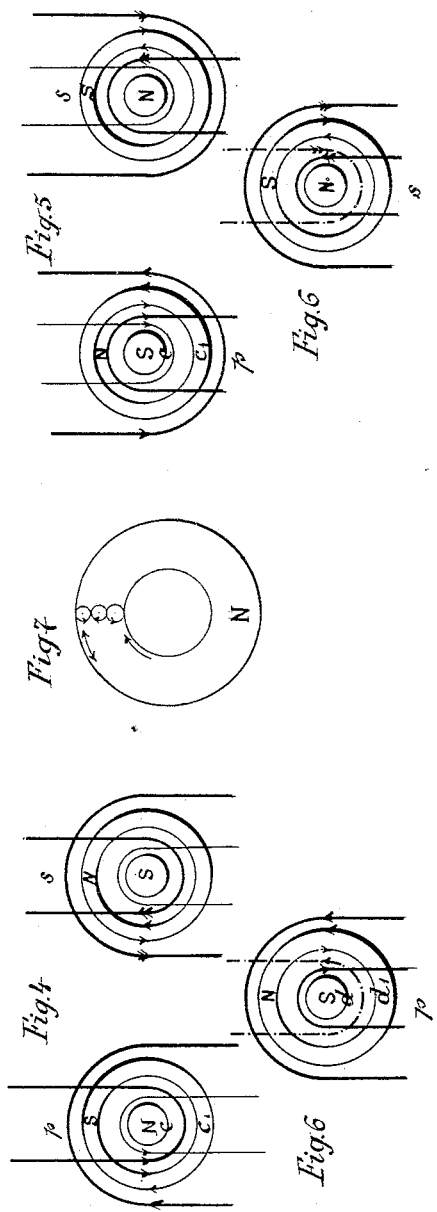

UNITED STATES PATENT OFFICE.

FRANZ FILIPP STÖGERMAYR, OF VIENNA, AUSTRIA-HUNGARY, ASSIGNOR OF ONE-HALF TO VICTOR GLASSNER, OF SAME PLACE.

INDUCTION-COIL.

SPECIFICATION forming part of Letters Patent No. 351,077, dated October 19, 1886.

Application filed May 12, 1886. Serial No. 201,950. (No model.) Patented in France March 30, 1886, No. 175,140, and in Belgium March 30, 1886, No. 72,551.

*To all whom it may concern:*

Be it known that I, FRANZ FILIPP STÖGERMAYR, a subject of the Emperor of Austria-Hungary, residing at Vienna, in the Province of Lower Austria, in the Empire of Austria-Hungary, have invented certain new and useful Improvements in Induction-Coils, (for which Letters Patent have been obtained in France, No. 175,140, dated March 30, 1886, and in Belgium, No. 72,551, dated March 30, 1886;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to induction-coils; and it consists in the novel construction and combination of the parts hereinafter fully described and claimed.

The induction-coil consists, essentially, of three coils of insulated wire wound upon iron cores in such a manner that poles of opposite name are presented to one another when the coils are arranged upon the same axial line. The two end coils are in circuit with a battery and with a circuit-closer. The circuit of the central coil constitutes the main working-circuit of the generator, and may have a commutator included in it for switching the currents of alternate polarity into the same direction. The three coils are inclosed in cylinders of soft iron, wound with an insulated conducting-wire branching off from the main circuit between the central coil and the commutator. The same wire is also wound round the cores of the three coils. This wire and the cylinders intensify the magnetism generated by the current passing through the coils. The circuit-closer and commutator are preferably mounted upon the same shaft, so that their action may be synchronous. The said shaft may be driven by a small electric motor provided with a rheostat for automatically regulating its speed. The necessary electric current for driving the motor may be derived, in the first place, from a battery, and afterward from the current induced in the working-circuit.

In the drawings, Figure 1 is a diagrammatic view of the current-generator. Fig. 2 is a front elevation of the circuit-closer and the commutator. Fig. 2ª is a side elevation of one-half of the circuit-closer. Fig. 2ᵇ is a side elevation of one-half of the commutator. Fig. 3 is a sectional elevation of the rheostat. Figs. 4, 5, 6, and 7 are diagrams showing the direction of the currents at different times and at various parts of the machine.

The motor for driving the circuit-closer and commutator is not shown or described, as any form of electric motor may be employed.

A is the battery for generating the primary current, which passes through the wire 1 to the terminal $b^3$ of the circuit-closer B, the arrows in the drawings showing the direction of the current. From the terminal $b^3$ the current passes through the central shaft to the toothed disk $b$, mounted upon it. A contact-spring, $b^2$, bears upon the points of the teeth $b'$ as the disk $b$ revolves. Each time one of these teeth touches the spring the circuit is completed, and the current passes through the terminal $b^4$ and along the continuation of the wire 1.

C and C' are the end electro-magnets, provided with iron cores $c$ and $c'$, respectively. The wire 1 is wound around the core $c$. From thence it passes to the core $c'$, upon which it is also wound, and back to the negative pole of the battery.

Whenever the primary circuit is closed in the manner described, magnetism is excited in the cores $c$ and $c'$, the polarity of which is indicated by the letters N and S above the center of the cores in Fig. 1.

D is the induction-coil, provided with a core, $d$, placed between the cores $c$ and $c'$. The poles of the cores $c$ and $c'$ induce opposite polarity in the core $d$, and generate a current in the wire 2, wound upon it. The wire 2 is shown in long and short dotted lines, and the direction of the "current of closing," which commences when the circuit is closed, is shown by the single arrows. The double arrows upon wire 2 show the direction of the "current of opening," which sets in when the main circuit is broken. The derived current passes through the wire 3. This wire is shown by a thick line, which branches off from the induction-circuit wire 2 at $y\ y$, and is conducted, as shown in Fig. 1, round the cores $c\ d\ c'$, and also round three iron cylinders, $c^3\ d'\ c^4$, in which the aforesaid cores are respectively inclosed. At the moment of the closing of the primary current the induced current in wire 3 runs in the direction of the single arrows, and at the moment of interruption in the reverse direction, as shown by the double arrows. The current in the wire 3 aids the current in wire 1 in producing magnetism in the cores $c\ d\ c'$, since the two wires run parallel, and it also creates magnetic poles in the cylinders $c^3\ d'\ c^4$, according to Ampère's laws of peripheral currents in iron cores, and shown graphically in Fig. 7. When the primary current in wire 1 is interrupted and the current of opening induced in wire 2 in the direction of the double arrows, the direction of the derived current in wire 3 is also reversed, as shown by the double arrows. This effects a change of polarity in all the magnetic poles, as indicated beneath the axis of the cores in Fig. 1. By these means a much stronger induction-current of opening is produced than could result from the simple demagnetization of the cores. A resistance, $r$, is introduced into the derived current for the purpose of allowing only a small portion of the induction-current to enter this line.

The views $s$, in Figs. 4, 5, and 6, show the direction of the currents at the moment of interruption. The views $p$ similarly show the direction when the primary circuit is closed. Fig. 4 shows the inner end of core $c$, Fig. 5 the inner end of core $c'$, and Fig. 6 the left-hand end of core $d$. The cores $c\ c'$ may also be formed of material capable of retaining its polarity, if desired, and the induction-circuit may be led around the said cores in the same manner as the primary circuit, and also around the cylinders $c^3\ c^4$, for the purpose of obtaining a permanent magnetic field, which will effect an increase of current until the maximum magnetization of the cores is reached.

When alternating currents are useful in the work for which the current is produced, no commutator need be used; but the alternating induction-current can be transformed into a current of one direction in the following manner:

F is a commutator provided with a disk, $f$, which is formed of insulating material and provided with a metallic ring, $f'$, upon each edge. Equidistant fingers $f^2$ project alternately from each of the rings $f'$. The number of fingers is the same as the number of teeth $b'$ in the circuit-closer. The springs $f^3$ press upon each of the rings $f'$ and form the terminals of the alternating current contained in the wire 2. Forked contact-springs $f^4$ are provided, which press upon the fingers $f^2$ of the right and left hand rings alternately, and, as seen in Fig. 1, both forks are never in contact with two fingers of the same ring at one time. The commencement and duration of contact of the fingers and springs are made to correspond with the closing of the primary circuit. The induction-current impulses coming in one direction are conducted to one terminal, X, of the working-circuit, and the impulses from the opposite direction to the other terminal, Z, by means of the said forked springs.

If the motor of the circuit-closer is an electromotor, a rheostat must be inserted in the circuit which drives the motor, so that the velocity of rotation may be kept constant. When the electromotor-current is derived from the induced current of the generator, the rheostat shown in Fig. 3 is used. This consists of a base-plate, E, having a frame, $e$, which carries a light grooved sheave, $e^2$, journaled upon the pin $e'$. A thin catgut cord, $e^3$, passes over the grooved sheave, and is attached on one side to the core $e^4$ of the solenoid S, and on the other side to the metallic cap $e^5$. A metallic contact-rod, $e^6$, is adjustably connected by means of a screw-thread to the cap $e^5$. A glass tube, $e^8$, is provided and cemented into the metallic socket $e^9$, the bottom of which is plated with silver. The contact-rod $e^6$ depends within the tube $e^8$, which is nearly filled with liquid—such as water—which is a conductor of electricity. A graduated scale, $t$, is provided, which marks the position of the bottom of the contact-rod. A ring, $e^7$, surrounds the tube $e^8$, and the cap and rod are made so that they will slightly overbalance the core of the solenoid when no current is passing. The cap then rests upon the ring $e^7$.

The rheostat is inserted in the circuit to be regulated, after having been adjusted to a normal resistance, by regulating the distance between the end of the rod $e^6$ and the metallic bottom of the socket $e^9$. When the strength of current passing into the rheostat exceeds the normal, the core of the solenoid will be drawn downward and the resistance of the liquid column will be proportionately increased, so that the current returning to the main line will remain constant.

What I claim is—

1. In an induction-coil, the combination of two end coils provided with central cores and inclosed in cylinders of magnetic material arranged on the same axial line and inserted in the circuit of a battery, a circuit-closer, also included in the said circuit, a coil, also provided with a central core and inclosed in a cylinder and interposed between the two end coils, and a circuit branching from the central coil and wound upon the three cylinders, so that they are rendered of different polarity to their respective central cores, and so that the effect of the primary current is intensified, substantially as set forth.

2. In an induction-coil, the combination of two end coils provided with central cores arranged on the same axial line and inserted in the circuit of a battery, a circuit-closer, also included in the said circuit, a coil, also provided with a central core and interposed between the two end coils, and a commutator for converting the alternating into a continuous current, and consisting of a disk of insulating material mounted on the circuit-closer shaft, two metallic rings provided with contact-fingers and connected to the terminals of the alternating current by springs, and two forked springs bearing upon the said fingers and connected to the terminals of the working-circuits, the circuit-closer and commutator being synchronous in action, substantially as set forth.

3. In an induction-coil, the combination of two end coils provided with central cores arranged on the same axial line and inserted in the circuit of a battery, a circuit-closer, also included in the said circuit, a coil, also provided with a central core and interposed between the two end coils, and a rheostat for automatically regulating the motion of the circuit-closer, and consisting of a solenoid provided with a core, and a metallic rod projecting into a vessel containing a liquid of low conductivity, through which the current must pass, the said solenoid-core and the rod being so connected that any increase in the attraction of the solenoid causes a corresponding increase in the resistance of the liquid, substantially as and for the purpose set forth.

4. The herein-described rheostat, which consists of the solenoid S and graduated glass tube $e^5$, having a metallic bottom and annular flange, $e^7$, in combination with the rod $e^6$, cap $e^5$, in which said rod is adjustable, the core $e^4$ of the solenoid, connected with the cap of the rod by means of a catgut cord, and the pulley $e^2$, substantially as and for the purpose set forth.

5. The herein-described commutator, consisting, essentially, of a rotatable disk of non-conducting material, and provided at opposite peripheral edges with metallic rings provided with metallic pins that project over the periphery of the disk, the pins of one ring lying in planes intermediate of those of the other ring, in combination with contact-springs connected with the terminals of an alternating electric circuit, and forked springs connected with the terminals of the working-circuit, the branches of the forks of which springs are arranged to alternately make and break contact with the pins projecting from the rings, and to cause one of said springs only to make contact with the pins of one of the rings at a time, substantially as and for the purpose set forth.

In testimony whereof I affix my signature in presence of two witnesses.

F. F. STÖGERMAYR.

Witnesses:
 EDMUND JUSSON,
 OTTO SCHEFFER.